(12) United States Patent
Nakamura (10) Patent No.: US 8,349,481 B2
(45) Date of Patent: Jan. 8, 2013

(54) POWER STORAGE APPARATUS

(75) Inventor: Yoshiyuki Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 570 days.

(21) Appl. No.: 12/663,818

(22) PCT Filed: Jun. 19, 2008

(86) PCT No.: PCT/JP2008/061200
§ 371 (c)(1),
(2), (4) Date: Dec. 9, 2009

(87) PCT Pub. No.: WO2009/004928
PCT Pub. Date: Jan. 8, 2009

(65) Prior Publication Data
US 2011/0212354 A1 Sep. 1, 2011

(30) Foreign Application Priority Data
Jun. 29, 2007 (JP) ................................. 2007-171528

(51) Int. Cl.
*H01M 10/50* (2006.01)
*H01G 9/155* (2006.01)
(52) U.S. Cl. ........... 429/120; 429/71; 429/72; 62/259.2; 361/535

(58) Field of Classification Search .................. 429/120, 429/71, 72; 62/259.2; 361/535
See application file for complete search history.

(56) References Cited

U.S. PATENT DOCUMENTS
2006/0090492 A1* 5/2006 Ahn et al. ..................... 62/259.2
2006/0093901 A1* 5/2006 Lee et al. ....................... 429/120

FOREIGN PATENT DOCUMENTS

| | | |
|---|---|---|
| JP | 2004-031281 A | 1/2004 |
| JP | 2005-071784 A | 3/2005 |
| JP | 2006-012792 A | 1/2006 |
| JP | 2006-128123 A | 5/2006 |
| JP | 2006-331956 A | 12/2006 |
| JP | 2007-018917 A | 1/2007 |
| WO | WO98/32186 | 7/1998 |

* cited by examiner

*Primary Examiner* — Ula C Ruddock
*Assistant Examiner* — Frank Chernow
(74) *Attorney, Agent, or Firm* — Kenyon & Kenyon LLP (57) ABSTRACT

A power storage apparatus has a power storage element including an electrolyte layer and a plurality of electrode elements stacked with the electrolyte layer interposed between them, and a case accommodating the power storage element and a heat exchange medium for use in heat exchange with the power storage element. The power storage element has an opening portion passing through the power storage element and extending from one end face to the other end face of the power storage element in a stacking direction. A top-face portion of the case located above the power storage element includes an inclined surface inclined with respect to the stacking direction in the power storage element.

10 Claims, 6 Drawing Sheets

FIG.9

POWER STORAGE APPARATUS

This is a 371 national phase application of PCT/JP2008/061200 filed Jun. 19, 2008, claiming priority to Japanese Patent Application No. 2007-171528 filed Jun. 29, 2007, the contents of which are incorporated herein by reference.

TECHNICAL FIELD

The present invention relates to a power storage apparatus having a structure in which a plurality of electrode elements are stacked with an electrolyte layer interposed between them and the power storage apparatus can be efficiently cooled.

BACKGROUND

A battery pack formed of a secondary battery has been conventionally used as a battery for a hybrid vehicle or an electric vehicle. Since the secondary battery generates heat during charge and discharge and the like to, the performance of the battery may be degraded and the life thereof may be shortened.

To address this, the secondary battery may be cooled by bringing a cooling medium into contact with the secondary battery placed in the battery pack.

[Patent Document] International Publication WO98/32186

DISCLOSURE OF THE INVENTION

Problems to be Solved by the Invention

In the abovementioned structure in which the cooling medium is brought in contact with the secondary battery, however, the cooling medium is in contact only with an outer surface of the secondary battery. This can cool the outer surface of the secondary battery and adjacent portions, but inner areas thereof are difficult to cool since the cooling medium is not in contact with those areas.

In a secondary battery having a structure in which a plurality of electrode elements are stacked with an electrolyte layer interposed between them, heat radiation varies among areas within a plane orthogonal to the stacking direction. For example, in an area closer to the center, heat may be unlikely to escape to result in a higher temperature in that area closer to the center than in areas closer to the periphery. This causes variations in the distribution of temperature within the plane orthogonal to the stacking direction.

It is thus a main object of the present invention to provide a power storage apparatus in which variations in temperature distribution can be suppressed within a plane orthogonal to a stacking direction.

Means for Solving the Problems

According to the present invention, a power storage apparatus comprises a power storage element including an electrolyte layer and a plurality of electrode elements stacked with the electrolyte layer interposed between the electrode elements; and a case accommodating the power storage element and a heat exchange medium for use in heat exchange with the power storage element. The power storage element has a first and second opening portions passing through the power storage element and extending from one end face to the other end face of the power storage element in a stacking direction. The second opening portion has a lower thermal energy than a thermal energy of the first opening portion. A top-face portion of the case located above the power storage element includes an inclined surface inclined with respect to the stacking direction in the power storage element. A distance from one end of the first opening portion to the top-face portion in the stacking direction is longer than a distance from one end of the second opening portion to the top-face portion in the stacking direction. In other words, the inclined surface is provided for the top-face portion of the case such that the abovementioned distance relationship is satisfied.

The first and second opening portions may be formed so as to extend in the stacking direction of the power storage element.

The first opening portion is located closer to the center within a plane orthogonal to the stacking direction in the power storage element, and the second opening portion is located in an outer portion within the plane orthogonal to the stacking direction in the power storage element.

On the other hand, the top-face portion of the case may have a generally uniform thickness. In addition, the top-face portion of the case is formed of a continuous inclined surface.

Effect of the Invention

According to the present invention, the opening portion through which the heat exchange medium passes is formed in the power storage element to allow suppression of variations in temperature within the plane orthogonal to the stacking direction in the power storage element. In addition, since the inclined surface is formed in at least part of the top-face portion of the case, the heat exchange medium can be efficiently circulated by natural convection within the case.

BEST MODE FOR CARRYING OUT THE INVENTION

An embodiment of the present invention will hereinafter be described.

Embodiment 1

A battery pack serving as a power storage apparatus which is Embodiment 1 of the present invention will be described with reference to FIG. 1 to FIG. 4B. The battery pack of Embodiment 1 has a layer-built cell and a case for housing the layer-built cell. The battery pack of Embodiment 1 is mounted on a vehicle.

Figure 1:
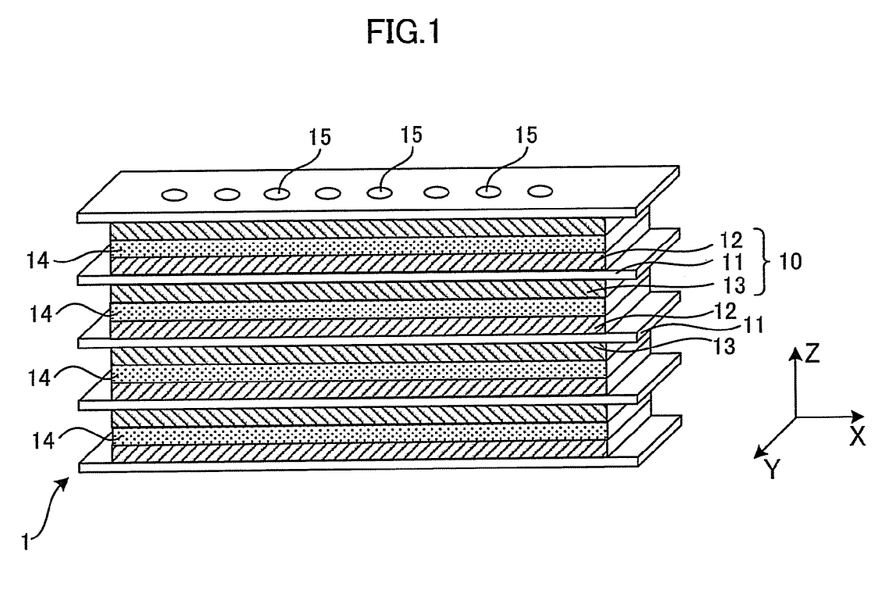
FIG. 1 is a perspective view showing the schematic structure of a layer-built cell in Embodiment 1 of the present invention.
Figure 2:
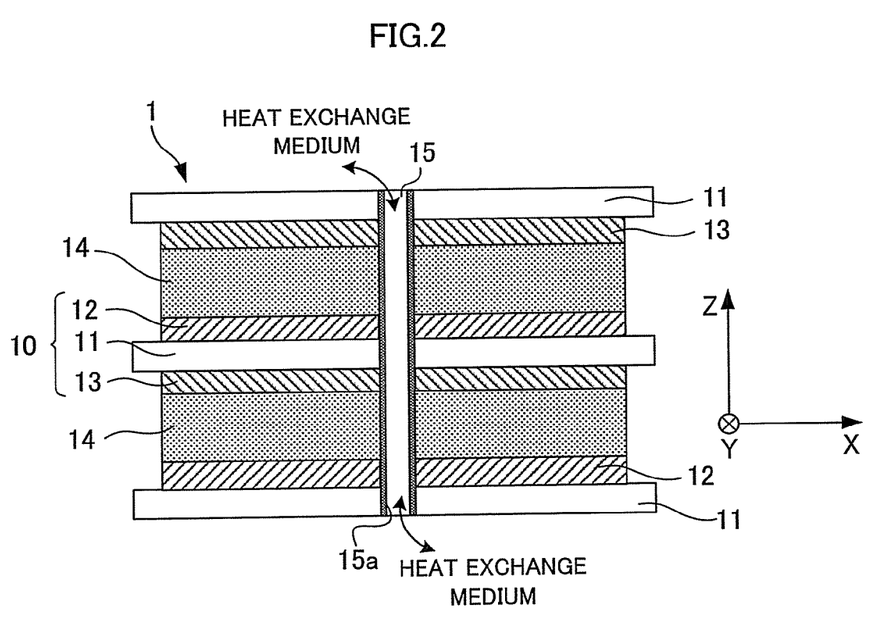
FIG. 2 is a section view showing the internal structure of the layer-built cell in Embodiment 1.

The structure of the layer-built cell in the battery pack of Embodiment 1 will be first described with reference to FIG. 1 and FIG. 2. FIG. 1 is a perspective view showing the outer appearance of the structure of the layer-built cell. FIG. 2 is a section view showing the schematic structure of a portion of the layer-built cell. An X axis, a Y axis, and a Z axis shown in FIGS. 1 and 2 represent axes orthogonal to each other, and the Z axis corresponds to the direction of gravity.

The layer-built cell 1 has a structure in which a plurality of bipolar electrodes (electrode elements) 10 are stacked with a solid electrolyte layer 14 interposed between them. In other words, the layer-built cell 1 is an assembled battery formed by stacking a plurality of cells. The cell refers to a power generation element which is formed of the solid electrolyte layer 14 and electrode layers 12, 13 placed on both sides of the solid electrolyte layer 14 in the Z direction.

The number of stacked cells can be set as appropriate. While Embodiment 1 is described in conjunction with the use of the cell as a secondary battery, the present invention is applicable to the case where an electric double layer capacitor (condenser) is used.

A positive electrode layer (electrode layer) 12 is formed on one surface of a collector plate 11, and a negative electrode layer (electrode layer) 13 is formed on the other surface of the collector plate 11. The electrode layers 12, 13 and the collector plate 11 constitute the bipolar electrode 10. The electrode layers 12, 13 can be formed on the collector plate 11 by using an inkjet method and the like.

The electrode layer (the positive electrode layer or the negative electrode layer) is formed only on one surface of the collector plate 11 which is placed at each end of the layer-built cell 1 in the stacking direction (Z direction). As later described, an electrode tab (a positive electrode tab or a negative electrode tab) for taking an electric current is electrically and mechanically connected to the other surface of that collector plate 11.

The electrode layers 12 and 13 contain active materials appropriate for the positive electrode and the negative electrode, respectively. Each of the electrode layers 12 and 13 also contains a conductive agent, a binder, an inorganic solid electrolyte for increasing ionic conduction, a polymer gel electrolyte, a polymer solid electrolyte, an additive or the like as required.

For example, in a nickel metal hydride battery, a nickel oxide can be used as the active material of the positive electrode layer 12, and a hydrogen-absorbing alloy such as MmNi$_{(5-x-y-z)}$Al$_x$Mn$_y$Co$_z$ (Mm: misch metal) can be used as the active material of the negative electrode layer 13. In a lithium-ion battery, a lithium transition metal composite oxide can be used as the active material of the positive electrode layer 12, and carbon can be used as the active material of the negative electrode layer 13. As the conductive agent, it is possible to use acetylene black, carbon black, graphite, carbon fiber, and carbon nanotube.

While Embodiment 1 is described in conjunction with the use of the bipolar electrode 10, the present invention is not limited thereto. For example, it is possible to use an electrode element (positive electrode element) in which a positive electrode layer is formed on each surface of a collector plate and an electrode element (negative electrode element) in which a negative electrode layer is formed on each surface of a collector plate. In this case, the electrode element having the positive electrode layer formed thereon and the electrode element having the negative electrode layer formed thereon are placed (stacked) alternately with a solid electrolyte layer interposed between them.

The collector plate 11 can be formed of aluminum foil or a plurality of types of metal (alloy), for example. Alternatively, the surface of metal (except for aluminum) may be covered with aluminum and the metal may be used as the collector plate 11.

As the collector plate 11, a so-called composite collector plate including a plurality of types of metal foil bonded together may be used. When the composite collector plate is used, aluminum or the like may be used as the material of the positive electrode collector plate, and nickel, copper or the like may be used as the material of the negative electrode collector plate. In the composite collector plate, the positive electrode collector plate and the negative electrode collector plate may be in direct contact with each other or the positive electrode collector plate and the negative electrode collector plate may be placed with a conductive layer interposed between them.

The solid electrolyte layer 14 contains a group of particles made of a plurality of particles and a binding agent for binding the particles. An inorganic solid electrolyte or a polymer solid electrolyte may be used as the solid electrolyte layer 14.

It is possible to use a nitride of Li, a halide, an oxysalt, and a phosphide sulfide as the inorganic solid electrolyte, by way of example. More specifically, it is possible to use $Li_3N$, $LiI$, $Li_3N$—$LiI$—$LiOH$, $LiSiO_4$—$LiI$—$LiOH$, $Li_3PO_4$—$Li_4SiO_4$, $Li_2SiS_3$, $Li_2O$—$B_2O_3$, $Li_2O_2$—$SiO_2$, $L_2S$—$GeS_4$, $Li_2S$—$P_2S_5$, $LiI$—$Li_2S$—$P_2P_5$.

As the polymer solid electrolyte, it is possible to use a material made of the abovementioned electrolyte and a polymer causing dissociation of the electrolyte, and a polymer material having an ionic dissociation group, for example. As the polymer causing dissociation of the electrolyte, it is possible to use a derivative of polyethylene oxide, a polymer containing the derivative, a derivative of polypropylene oxide, a polymer containing the derivative, and a phosphate polymer, for example. Both of the inorganic solid electrolyte and the polymer solid electrolyte may be used in combination.

In the layer-built cell 1 of the abovementioned structure, a plurality of opening portions 15 extending in the stacking direction are formed within a plane orthogonal to the stacking direction (representing an X-Y plane, and hereinafter referred to as a stacking plane). Both ends of each of the opening portions 15 are exposed outside at both end faces of the layer-built cell 1 in the stacking direction. In other words, the opening portions 15 pass through the layer-built cell 1.

The section shape (the shape within the stacking plane) of the opening portion 15 is formed in a generally circular shape. As shown in FIG. 2, an insulating layer 15a made of polymer resin or the like is formed on an inner circumferential surface of the opening portion 15. The diameter of the opening portion 15 is set to have such a size as to allow convection of a heat exchange medium, as later described.

While FIG. 1 shows the plurality of opening portions 15 arranged in the X direction, the opening portions 15 arranged in the X direction are also arranged in the Y direction in reality. In other words, the plurality of opening portions 15 are provided to form the lines in the X direction and the lines in the Y direction within the X-Y plane. The positions where the plurality of opening portions 15 are provided can be set as appropriate. Alternatively, only one opening portion 15 may be provided in the layer-built cell 1.

According to Embodiment 1, since the opening portions 15 are formed to pass through the layer-built cell 1, the heat exchange medium located outside the layer-built cell 1 can be directed into the layer-built cell 1 (into the opening portions 15) through the opening portions 15, and heat generated within the layer-built cell 1 due to charge and discharge and the like can be escaped to the outside through the heat exchange medium. This can reduce a temperature rise within the layer-built cell 1.

The heat exchange medium is a gas or a liquid which is used to cool the layer-built cell 1 through heat exchange with the layer-built cell 1. The heat exchange medium is also in contact with an outer surface of the layer-built cell 1 to cool the layer-built cell 1.

When a gas is used as the heat exchange medium, a dry gas such as air and a nitrogen gas can be used particularly. When a fluid is used as the heat exchange medium, an insulating oil or an inert fluid can be used particularly. Silicone oil may be used as the insulating oil. As the inert fluid (fluid having insulation), it is possible to use Fluorinert, Novec HFE (hydrofluoroether), and Novec1230 (manufactured by 3M) which are fluorochemical inert fluid.

While each of the opening portions 15 extends in the stacking direction in Embodiment 1, the present invention is not limited thereto. It is essential only that the opening portions 15 should pass through the interior of the layer-built cell 1, and for example, the opening portions 15 may be inclined with respect to the stacking plane. The angle of the inclination may be set as appropriate.

Such a structure can also direct the heat exchange medium located outside the layer-built cell 1 into the layer-built cell 1 through the opening portions and can direct the heat exchange medium to the outside of the layer-built cell 1 after the heat exchange within the layer-built cell 1. This can efficiently cool the layer-built cell 1.

While Embodiment 1 is described in conjunction with the use of the solid electrolyte layer 14, the present invention is not limited thereto, and a gel or liquid electrolyte may be used. For example, a nonwoven fabric serving as a separator and impregnated with an electrolyte solution may be used.

Figure 3:
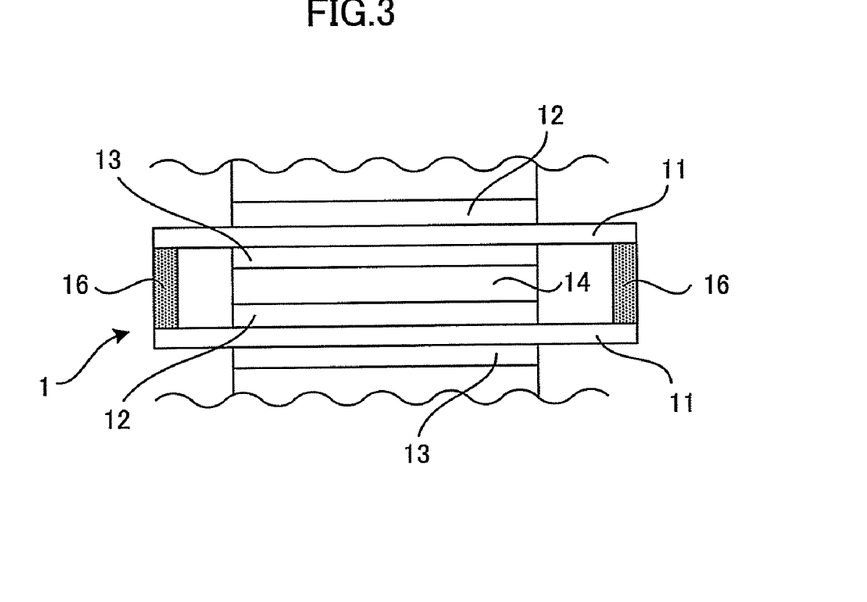
FIG. 3 is a section view showing the structure of part of a layer-built cell which is a modification of Embodiment 1.

In this case, a seal member 16 needs to be used as shown in FIG. 3 in order to prevent the liquid electrolyte solution or the like from leaking outside the layer-built cell 1. Specifically, the seal member 16 can be placed between the collector plates 11 adjacent to each other in the stacking direction. In FIG. 3, the opening portions 15 are omitted.

Next, a method of producing the layer-built cell 1 of Embodiment 1 will be described.

When the layer-built cell 1 is produced by applying coatings of the materials forming the bipolar electrode 10 and the solid electrolyte layer 14 with the inkjet method or the like, some measures should be taken to avoid application of the coatings of the abovementioned materials onto the portions where the opening portions 15 should be formed. Specifically, a shield member can be used to avoid the application of the coatings of the abovementioned materials.

On the other hand, when the bipolar electrode 10 and the solid electrolyte layer 14 are individually formed and then they are stacked, the opening portions 15 may be formed in the process of forming the bipolar electrode 10 and the solid electrolyte layer 14.

For example, when the solid electrolyte layer 14 is formed through pressing, the opening portions 15 may also be formed during the pressing. When the collector plate 11 is formed by cutting a long length of metal foil or the like, the portions corresponding to the opening portions 15 may be removed or cut during the cutting. Then, the coatings of the materials forming the electrode layers 12 and 13 can be applied onto the collector plate 11 having the opening portions 15 formed therein, thereby providing the bipolar electrode 10. In this case, the coatings of materials forming the electrode layers 12 and 13 are applied onto the areas of the collector plate 11 except for the opening portions 15.

The abovementioned method of producing the layer-built cell 1 is illustrative, and another method may be used for the production. It is essential only that the opening portions 15 should be formed.

Figure 4A:
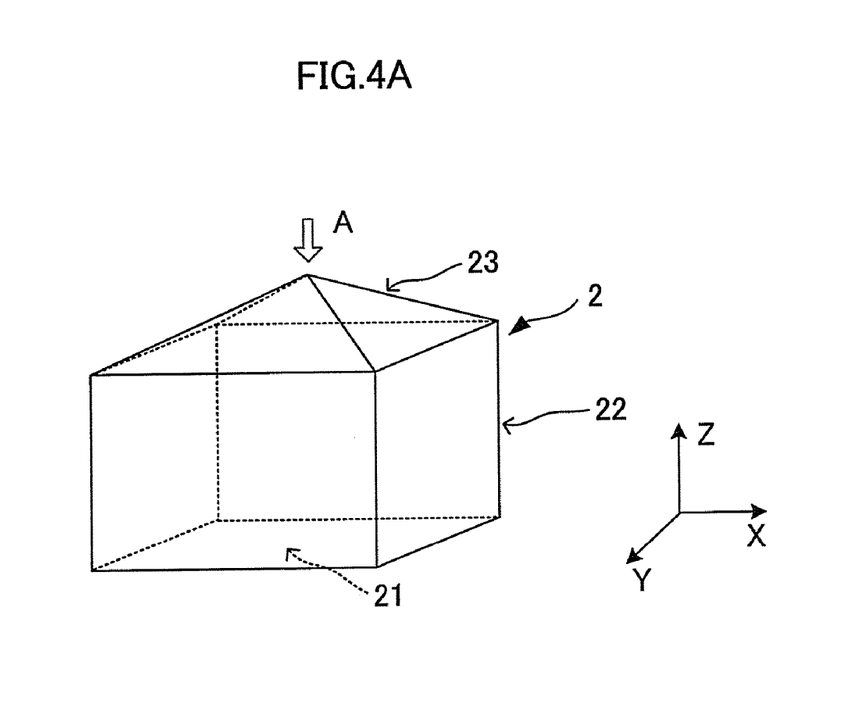
FIG. 4A is a perspective view showing the outer appearance of a case in Embodiment 1.
Figure 4B:
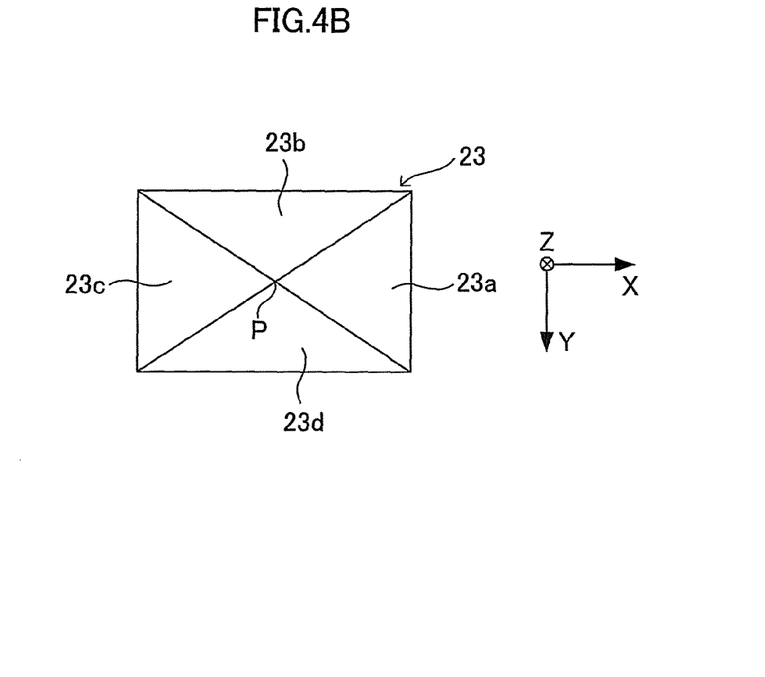
FIG. 4B is a top view of the case in Embodiment 1.

Next, the structure of the case for housing the abovementioned layer-built cell 1 will be described with reference to FIG. 4A and FIG. 4B. FIG. 4A is a perspective view showing the outer appearance of the case for housing the layer-built cell of Embodiment 1. FIG. 4B is a plan view showing the case from above, that is, from the direction of an arrow A in FIG. 4A.

The case 2 has a bottom-face portion 21, a side-face portion 22 formed of four side faces, and a top-face portion 23. The case 2 is formed to be hermetically sealed inside. The case 2 can be provided, for example, by fixing a lid member constituting the top-face portion 23 to a container constituting the bottom-face portion 21 and the side-face portion 22 with a fastening member such as a bolt.

The layer-built cell 1 and the heat exchange medium as described above are accommodated by the case 2. The heat exchange medium is in contact with all of the inner wall surfaces of the case 2.

For forming the case 2 of the container (the bottom-face portion 21 and the side-face portion 22) and the lid member (the top-face portion 23) as described above, the layer-built cell 1 and the heat exchange medium are placed within the container and then the lid member is fixed to the container. The heat exchange medium is not in contact with the inner wall surface of the lid member at this point. Thus, after the lid member is fixed to the container, the heat exchange medium is added thereinto so as to bring the heat exchange medium into the inner wall surface of the lid member. Specifically, a hole portion for adding the heat exchange medium may be formed in the lid member and the hole portion may be closed after the heat exchange medium is added.

On the other hand, the top-face portion 23 of the case 2 has four inclined surfaces 23a to 23d as shown in FIG. 4B. Each of the inclined surfaces 23a to 23d extends from a peak P toward each side face constituting the side-face portion 22.

The case 2 is preferably made of a material having excellent durability and corrosion resistance. Specifically, the material may be a metal such as aluminum. It is possible to supply gas for cooling to an outer surface of the case 2, that is, to a surface of the case 2 opposite to the surface in contact with the heat exchange medium. The supply of the gas can be performed by using a fan or the like. In addition, heat-radiating fins formed protrusively may be provided on the outer surface of the case 2 in order to improve heat radiation in the case 2.

Figure 5:
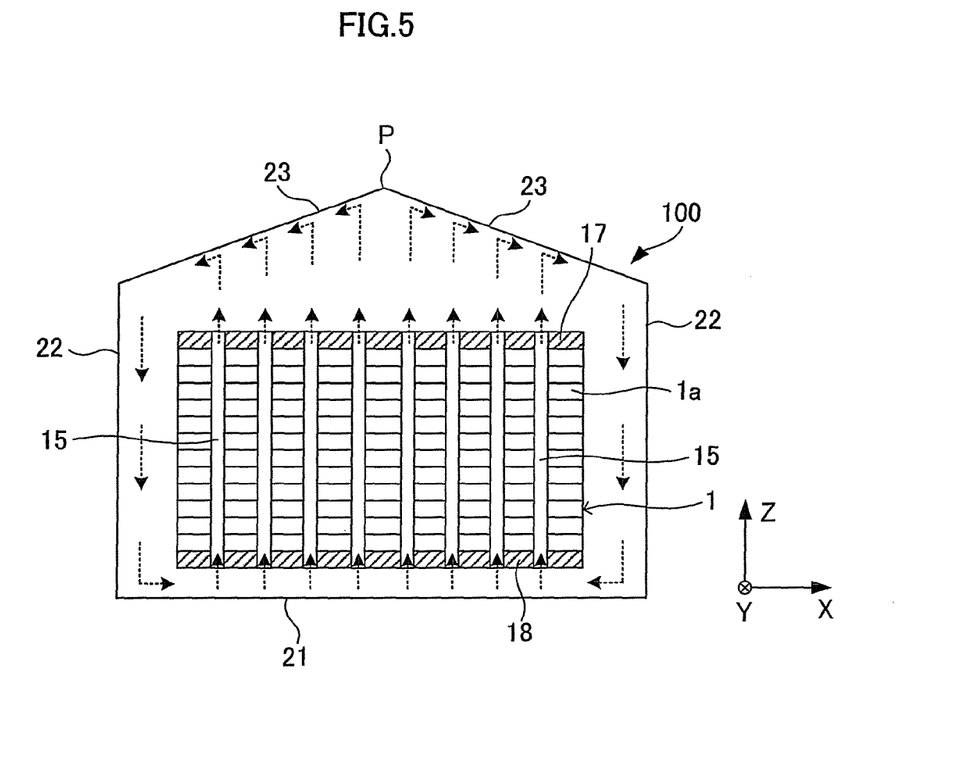
FIG. 5 is a section view of a battery pack of Embodiment 1.

Next, the operation (flow) of the heat exchange medium housed in the case 2 will be described with reference to FIG. 5. FIG. 5 is a section view showing the battery pack of Embodiment 1. Arrows shown by dotted lines in FIG. 5 represent the main moving directions of the heat exchange medium.

In FIG. 5, a negative electrode tab 17 and a positive electrode tab 18 for taking an electric current generated in the layer-built cell 1 are provided at both ends of the layer-built cell 1 in the stacking direction. As described above, the negative electrode tab 17 and the positive electrode tab 18 are connected to the collector plates 11 placed at both ends of the layer-built cell 1 in the stacking direction. Opening portions are also formed in the negative electrode tab 17 and the positive electrode tab 18 at positions corresponding to the opening portions 15 of the layer-built cell 1.

In FIG. 5, a plurality of cells 1a serving as the abovementioned power generation elements are stacked between the negative electrode tab 17 and the positive electrode tab 18. The negative electrode tab 17 and the positive electrode tab 18 are connected to an electronic device mounted on a vehicle (for example, a motor for use in running the vehicle or an inverter for driving the motor).

A spacing for ensuring the movement of the heat exchange medium, later described, is provided between the side-face portion 22 of the case 2 and the layer-built cell 1. A spacing for ensuring the movement of the heat exchange medium is also provided between the bottom-face portion 21 of the case 2 and the layer-built cell 1. In other words, the layer-built cell 1 is supported by a support member (not shown) and housed in the case 2 such that the layer-built cell 1 is placed at a position separate from all of the inner wall surfaces of the case 2.

When the layer-built cell 1 generates heat due to charge and discharge and the like of the layer-built cell 1, the heat exchange medium placed inside the opening portions 15 exchanges heat with the layer-built cell 1 (cells 1a) to hold heat. Thus, as the temperature of the layer-built cell 1 rises, the temperature of the heat exchange medium placed inside the opening portions 15 rises.

The heat exchange medium holding heat passes through the interiors of the opening portions 15 and moves toward the top-face portion 23 of the case 2. When the heat exchange medium reaches the top-face portion 23, the heat of the heat exchange medium is transferred to the top-face portion 23. The heat transferred to the top-face portion 23 is released into the outside of the battery pack 100 (into the atmosphere). This can cool the layer-built cell 1 (battery pack 100).

Since the heat exchange medium reaching the top-face portion 23 exchanges heat with the top-face portion 23, the temperature of the heat exchange medium drops. The heat exchange medium having the dropped temperature moves in the direction of gravity (moves downward). Another part of the heat exchange medium which exchanged heat with the layer-built cell 1 (the heat exchange medium holding heat) moves upward from below the top-face portion 23, so that the heat exchange medium having the dropped temperature moves downward along the inclined surfaces of the top-face portion 23.

Thus, after the heat exchange medium reaches the top-face portion 23, it moves toward the side-face portion 22 of the case 22 and then moves downward along the side-face portion 22 by natural convection. The heat exchange medium reaches the bottom-face portion 21 of the case 2 and moves toward the center of the bottom-face portion 21. At this point, the heat exchange medium enters into each of the opening portions 15 formed in the layer-built cell 1. In this manner, the heat exchange medium is circulated within the case 2 by natural convection.

In the battery pack 100 of Embodiment 1, the distance (the length in the Z direction) is the longest between one end of the opening portion 15 placed at the center of the layer-built cell 1 in the X direction and the top-face portion 23, whereas the distance is the shortest between one end of the opening portion 15 placed at the outermost portion of the layer-built cell 1 and the top-face portion 23. The distance is reduced from the center toward the outer portion of the layer-built cell 1.

While FIG. 5 shows the distance relationship between the opening portion 15 and the top-face portion 23 in the X-Z plane, the same distance relationship is also present between the opening portion 15 and the top-face portion 23 in the Y-Z plane.

In the structure of the layer-built cell 1 including the stacked cells 1a as in Embodiment 1, variations in the distribution of temperature easily occur within the stacking plane. This is because heat radiation varies among areas within the stacking plane. For example, heat may be likely to stay and the temperature may be higher in a central portion within the stacking plane than in an outer portion.

In this case, the temperature of the heat exchange medium which exchanged heat in the opening portion 15 located at the center within the stacking plane is higher than the temperature of the heat exchange medium which exchanged heat in the other opening portions 15. The temperatures of the heat exchange media which exchanged heat at the opening portions 15 located in the outer portions within the stacking plane are lower.

Figure 6A:
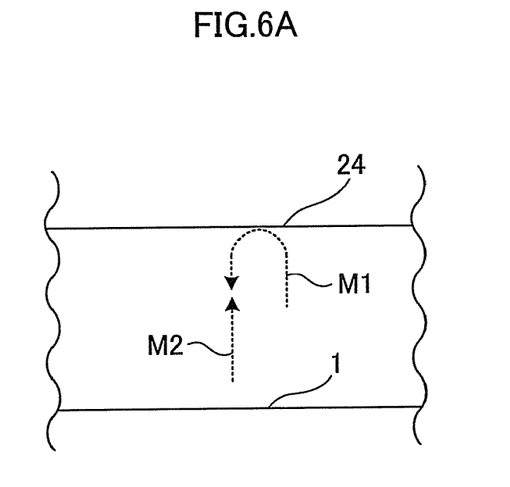
FIG. 6A is a diagram showing movements of a heat exchange medium.

As shown in FIG. 6A, when the case 2 has a top-face portion 24 (corresponding to the abovementioned top-face portion 23) generally in parallel with the end face of the layer-built cell 1 in the stacking direction, the heat exchange medium cannot be circulated efficiently by natural convection within the case 2.

Specifically, in the structure shown in FIG. 6A, a heat exchange medium M1 exchanges heat in the opening portion 15, moves toward the top-face portion 24, and then is cooled through heat exchange with the top-face portion 24 and moves downward. Since a heat exchange medium M2 holding heat moves upward from the layer-built cell 1 at this point, the medium M2 collides against the cooled heat exchange medium M1 moving downward. In this case, the natural convection of the heat exchange medium is prevented and the heat exchange medium cannot be efficiently circulated within the case 2.

Figure 6B:
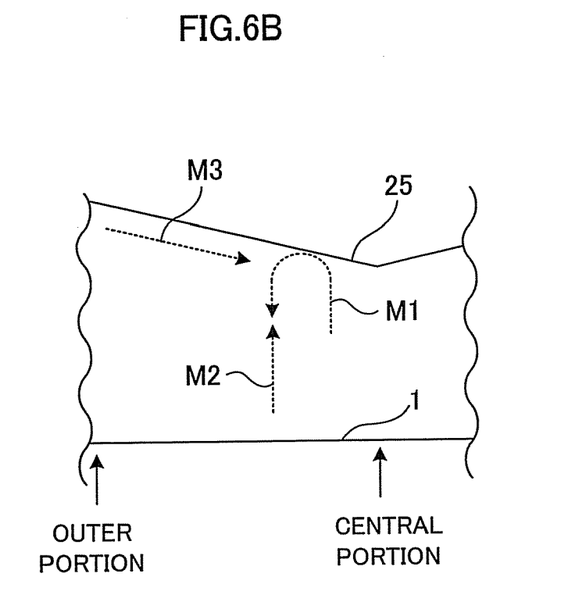
FIG. 6B is a diagram showing movements of a heat exchange medium.

On the other hand, as shown in FIG. 6B, when the case 2 has a top-face portion 25 (corresponding to the abovementioned top-face portion 23) formed such that the distance is the shortest between the case 2 and one end of the opening portion 15 placed at the center within the stacking plane, the heat exchange medium cannot be efficiently circulated by natural convection within the case 2.

Specifically, in the structure shown in FIG. 6B, a heat exchange medium M1 which was cooled through heat exchange with the top-face portion 25 and is moving downward collides against a heat exchange medium M2 holding heat and moving upward, thereby preventing the natural convection of the heat exchange medium. In addition, since a heat exchange medium M3 which was cooled in an outer portion of the top-face portion 25 moves toward the center, the heat exchange medium M3 collides against the heat exchange medium M2.

To address this, the top-face portion 23 of the case 2 can be formed as in Embodiment 1 to move all of the heat exchange medium cooled through heat exchange with the top-face portion 23 to the side-face portion 22 and then to the bottom-face portion 21. As a result, the heat exchange medium can be efficiently circulated within the case 2. This eliminates the need to provide an agitation member (a so-called fan) for forcedly circulating the heat exchange medium within the case 2, so that the battery pack 1 can be reduced in size and the cost can be cut.

In addition, since the plurality of opening portions 15 are provided within the stacking plane in Embodiment 1, the cooling effect of the heat exchange medium passing through those opening portions 15 can reduce variations in temperature distribution within the stacking plane.

The top-face portion 23 is formed of the inclined surfaces in Embodiment 1. Even when dust or the like settles on the outer surface of the top-face portion 23, that is, on the surface different from the surface in contact with the heat exchange medium, the self weight can drop the dust or the like. Specifically, the dust or the like moves along the inclined surfaces of the top-face portion 23 and then drops downward from the side-face portion 22.

It is possible that the outer surface of the top-face portion 23 of the case 2 may be formed of a generally flat face (X-Y plane) and the inner surfaces may be formed of inclined surfaces as shown in FIG. 4A and FIG. 5. In this case, the thickness of the top-face portion 23 (size in the Z direction) varies depending on the position in the X-Y plane.

While the top-face portion 23 of the case 2 is formed as shown in FIG. 4A and FIG. 5 in Embodiment 1, the present invention is not limited thereto. Any structure is possible as long as inclined surfaces are used to cause the circulation of the heat exchange medium within the case 2 through the natural convection thereof in specific directions. Specifically, the case 2 may have structures as shown in FIGS. 7 and 8.

Figure 7:
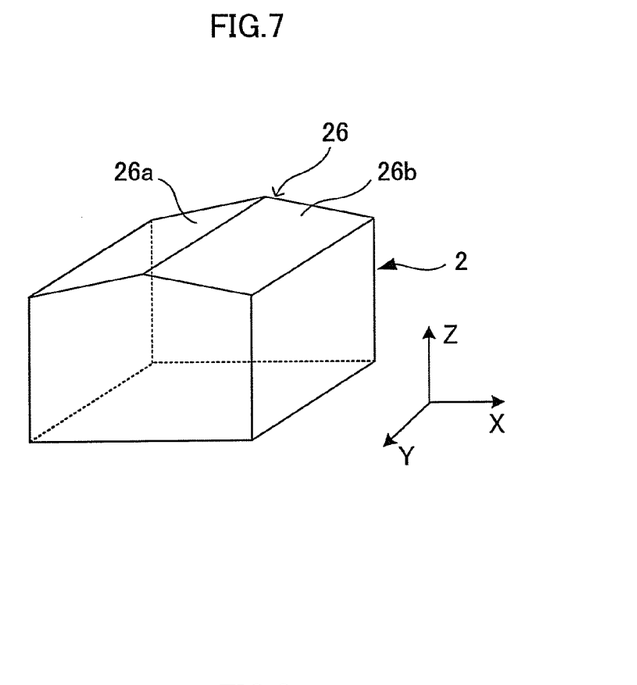
FIG. 7 is a perspective view showing the outer appearance of a case which is a modification of Embodiment 1.

In the structure shown in FIG. 7, a top-face portion 26 of the case 2 is formed of two inclined surfaces 26a and 26b. The case 2 has a generally uniform thickness. The structure can also achieve the same effects as those of the battery pack 100 of Embodiment 1 described above.

Figure 8:
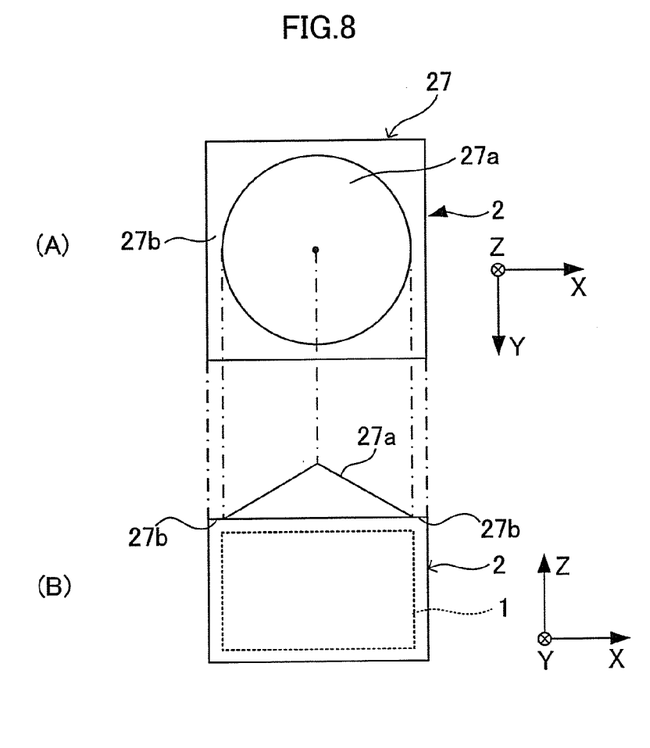
FIG. 8 is a top view (A) and a side view (B) showing a case which is another modification of Embodiment 1.

In the structure shown in FIG. 8, a top-face portion 27 of the case 2 is formed of a cone portion 27a and a flat portion 27b. The section (A) in FIG. 8 is a top view showing the case 2 viewed from above, while the section (B) in FIG. 8 is a side view of the battery pack. The case 2 shown in FIG. 8 also has a generally uniform thickness.

In the structure shown in FIG. 8, all of opening portions 15 provided for the layer-built cell 1 are placed inside the cone portion 27a when the case 2 is viewed from above. Thus, the heat exchange medium moves upward after heat exchange in the opening portions 15, reaches the cone portion 27a, and then is cooled through heat exchange with the cone portion 27a. The heat exchange medium which was cooled in the cone portion 27a moves along the cone portion 27a toward a side-face portion of the case 2. In this manner, the structure shown in FIG. 8 can also achieve the same effects as those of the battery pack 100 of Embodiment 1 described above.

While the top-face portion 23 of the case 2 has the shape shown in FIG. 4A in view of the heat radiation property of the layer-built cell 1 in Embodiment 1, the present invention is not limited thereto. For example, when a heat source (such as an engine or a motor) is placed near the battery pack, the thermal effect from the heat source may cause variations in the distribution of temperature within the stacking plane of the layer-built cell 1. Specifically, the temperature of an area (first area) closer to the heat source may be higher than the temperature of another area (second area) to degrade the heat radiation property. The placement near the battery pack means that the layer-built cell 1 is placed at a position where the layer-built cell 1 is susceptible to the thermal effect from the heat source.

Figure 9:
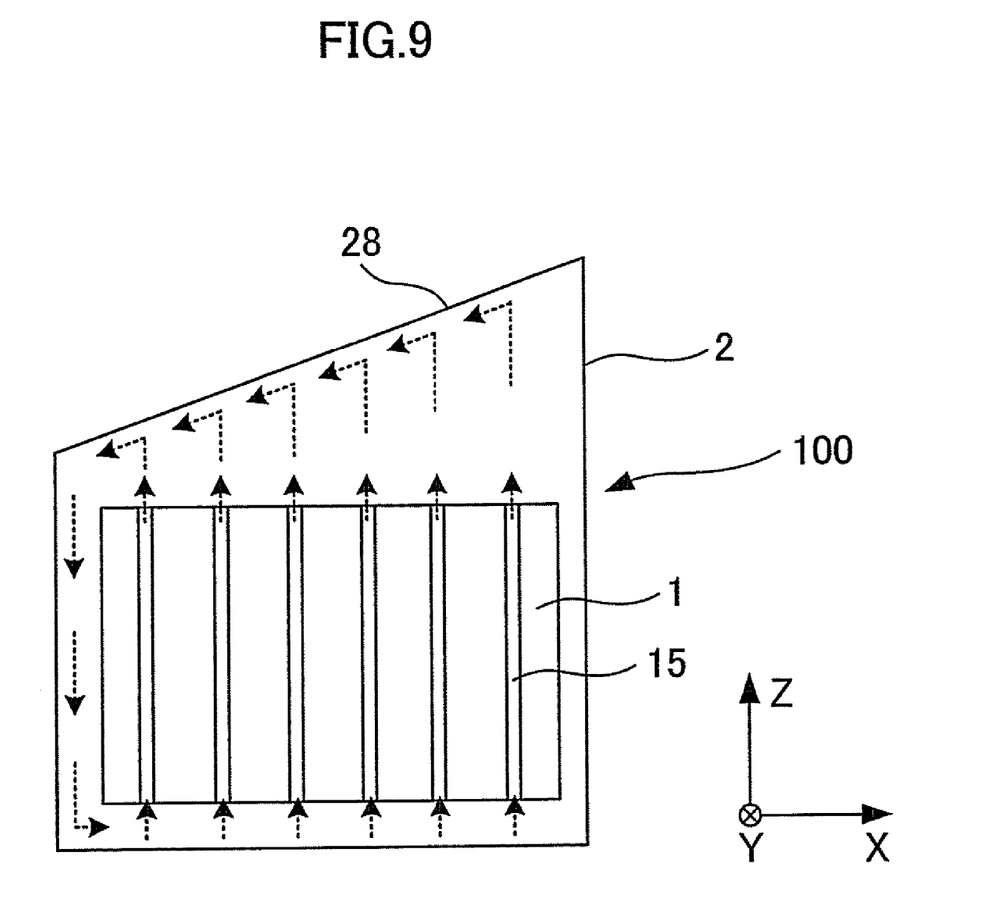
FIG. 9 is a section view showing a battery pack with a case which is another modification of Embodiment 1.

In this case, a top-face portion 28 of the case 2 can be formed as shown in FIG. 9. FIG. 9 is a section view showing the schematic structure of the battery pack 100, in which the heat source (not shown) is placed on the right side of the battery pack 100 in FIG. 9. The members identical to those described in Embodiment 1 are designated with the same reference numerals.

In the structure shown in FIG. 9, a heat exchange medium located within the opening portion 15 closest to the heat source is at the highest temperature, of the opening portions 15 provided for the layer-built cell 1. As the distance from the heat source is longer, the temperature of the heat exchange medium located within the opening portion 15 is lower. For this reason, in the structure shown in FIG. 9, the distance (the length in the Z direction) is the longest between one end of the opening portion 15 closest to the heat source and the top-face portion 28. As the distance from the heat source is longer, the distance is shorter between one end of the opening portion 15 and the top-face portion 28.

The case 2 structured as shown in FIG. 9 can cause natural convection of the heat exchange medium as indicated by arrows shown by dotted lines in FIG. 9 to circulate the heat exchange medium within the case 2. This can achieve the same effects as those in Embodiment 1 described above.

While the top-face portion of the case 2 is formed of the continuous inclined surface in abovementioned Embodiment 1, only some of the areas may be formed of an inclined surface. For example, the top-face portion of the case 2 may be formed by combining a surface inclined with respect to the X-Y plane with a surface generally in parallel with the X-Y plane. The top-face portion in this case is formed to conform to the abovementioned top-face portion 23 or the like.

Alternatively, the top-face portion of the case 2 may be formed by combining a surface generally in parallel with the X-Y plane with a surface generally in parallel with the X-Z plane (or the Y-Z plane). In this case, the top-face portion of the case 2 is formed in a stepped shape. The top-face portion in this case is also formed to conform to the abovementioned top-face portion 23 or the like.

For the X-Z plane or the Y-Z plane, the top-face portion of the case 2, specifically the inner surface thereof in contact with the heat exchange medium, may have a curvature. The surface having a curvature is formed to conform to the abovementioned top-face portion (inclined surface) of case 2.

The invention claimed is:

1. A power storage apparatus comprising:
a power storage element including an electrolyte layer and a plurality of electrode elements stacked with the electrolyte layer interposed between the electrode elements; and
a sealed case accommodating the power storage element and a heat exchange medium for use in heat exchange with the power storage element,
wherein the power storage element has first and second opening portions passing through the electrolyte layer and the electrode elements and extending from one end face to the other end face of the power storage element in a stacking direction, the second opening portion having a lower thermal energy than a thermal energy of the first opening portion, and
a top-face portion of the case located above the power storage element includes an inclined surface inclined with respect to the stacking direction in the power storage element such that a distance from one end of the first opening portion to the top-face portion in the stacking direction is longer than a distance from one end of the second opening portion to the top-face portion in the stacking direction.

2. The power storage apparatus according to claim 1, wherein the first and second opening portions extend in a direction orthogonal to the stacking plane of the electrolyte layer and the electrode elements.

3. The power storage apparatus according to claim 1, wherein the first opening portion is located closer to the center within a plane orthogonal to the stacking direction in the power storage element,
the second opening portion is located in an outer portion within the plane orthogonal to the stacking direction in the power storage element, and the top-face portion includes a plurality of inclined surfaces extending from a center of the top-face portion to an end of the top-face portion.

4. The power storage apparatus according to claim 1, wherein the top-face portion of the case has a generally uniform thickness.

5. The power storage apparatus according to claim 1, wherein the top-face portion of the case is formed of a continuous inclined surface.

6. The power storage apparatus according to claim 1, wherein the heat exchange medium is a liquid having insulation and the case is filled with the heat exchange medium.

7. The power storage apparatus according to claim 2, wherein the heat exchange medium is a liquid having insulation and the case is filled with the heat exchange medium.

8. The power storage apparatus according to claim 3, wherein the heat exchange medium is a liquid having insulation and the case is filled with the heat exchange medium.

9. The power storage apparatus according to claim 4, wherein the heat exchange medium is a liquid having insulation and the case is filled with the heat exchange medium.

10. The power storage apparatus according to claim 5, wherein the heat exchange medium is a liquid having insulation and the case is filled with the heat exchange medium.

* * * * *

UNITED STATES PATENT AND TRADEMARK OFFICE
CERTIFICATE OF CORRECTION

PATENT NO. : 8,349,481 B2
APPLICATION NO. : 12/663818
DATED : January 8, 2013
INVENTOR(S) : Yoshiyuki Nakamura It is certified that error appears in the above-identified patent and that said Letters Patent is hereby corrected as shown below:

In the Specifications:

COLUMN 4, LINE 28:

Please replace: "$Li_3N–LiI–LiOH, \quad LiSiO_4–LiI–LiOH, Li_3PO_4$"

with: --$Li_3N–LiI–LiOH, LiSiO_4, LiSiO_4–LiI–LiOH, Li_3PO_4$--

COLUMN 4, LINE 29:

Please replace: "$L_2S–GeS_4,$"

with: --$Li_2S–GeS_4,$--

Signed and Sealed this
Fourteenth Day of May, 2013

Teresa Stanek Rea
*Acting Director of the United States Patent and Trademark Office*